(12) United States Patent
Gumpoltsberger et al.

(10) Patent No.: US 8,088,032 B2
(45) Date of Patent: Jan. 3, 2012

(54) MULTI-SPEED TRANSMISSION

(75) Inventors: Gerhard Gumpoltsberger, Friedrichshafen (DE); Martin Brehmer, Tettnang (DE); Peter Ziemer, Tettnang (DE); Peter Tiesler, Meckenbeuren (DE); Gabor Diosi, Friedrichshafen (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 389 days.

(21) Appl. No.: 12/538,942

(22) Filed: Aug. 11, 2009

(65) Prior Publication Data

US 2010/0041508 A1    Feb. 18, 2010

(30) Foreign Application Priority Data

Aug. 13, 2008  (DE) .................. 10 2008 041 207

(51) Int. Cl.
*F16H 3/62* (2006.01)
(52) U.S. Cl. .................. 475/275; 475/284; 475/296
(58) Field of Classification Search .......... 475/275–278, 475/284, 296
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,955,627 B2 | 10/2005 | Thomas et al. | |
| 6,960,149 B2 | 11/2005 | Ziemer | |
| 6,991,578 B2 * | 1/2006 | Ziemer | 475/296 |
| 7,018,319 B2 * | 3/2006 | Ziemer | 475/296 |
| 7,115,061 B2 * | 10/2006 | Tiesler et al. | 475/276 |
| 7,201,698 B2 * | 4/2007 | Gumpoltsberger | 475/276 |
| 7,211,022 B2 * | 5/2007 | Tiesler et al. | 475/275 |
| 7,549,942 B2 | 6/2009 | Gumpoltsberger | |
| 7,556,582 B2 | 7/2009 | Gumpoltsberger | |
| 7,566,283 B2 | 7/2009 | Gumpoltsberger | |

(Continued)

FOREIGN PATENT DOCUMENTS

DE              29 36 969 A1     4/1981

(Continued)

OTHER PUBLICATIONS

Gumpoltsberger, Gerhard: Synthesis of Planetary Transmissions, ZF Friedrichshafen AG, 2009, 13 pages, Germany.

(Continued)

*Primary Examiner* — Ha D. Ho
(74) *Attorney, Agent, or Firm* — Davis & Bujold, P.L.L.C.

(57) ABSTRACT

The multi-step transmission including four gear sets, eight shafts, and six shifting elements. The sun gear of gearset (P1) communicates, via shaft (8) and clutch (48), with shaft (4), which communicates, via clutch (14), with shaft (1), that couples the sun gear of the gearset (P4), and communicates, via brake (04), with a housing. The ring gear of gearset (P1) couples shaft (1), and communicates, via clutch (17), with shaft (7), which couples the carriers of the gearsets (P3, P2). The carrier of gearset (P1) is connected, via shaft (6), to a component, which connects the ring gear of gearset (P4) to the sun gear of gearset (P3). The carrier of gearset (P4) communicates, via shaft(3) and brake (03), with the housing. The sun gear of gearset (P2) communicates, via shaft (5) and brake (05), with the housing. The output shaft couples the ring gears of gearsets (P3, P2).

10 Claims, 3 Drawing Sheets

U.S. PATENT DOCUMENTS

| | | |
|---|---|---|
| 7,699,743 B2 | 4/2010 | Diosi et al. |
| 2008/0161149 A1 | 7/2008 | Diosi et al. |
| 2009/0011891 A1 | 1/2009 | Phillips et al. |
| 2010/0048344 A1 | 2/2010 | Kamm et al. |
| 2011/0009228 A1 | 1/2011 | Bauknecht et al. |

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 637 A1 | 9/2007 |
| DE | 10 2008 000 428 | 2/2008 |
| DE | 10 2008 007 574 A1 | 8/2008 |
| DE | 10 2008 016 084 A1 | 10/2008 |
| DE | 10 2008 000 428 A1 | 9/2009 |
| EP | 0 434 525 A1 | 6/1991 |
| JP | 2005061445 A | 3/2005 |
| JP | 2006349153 A | 12/2006 |
| JP | 10 2006 006 637 A1 | 9/2007 |

OTHER PUBLICATIONS

Gumpoltsberger, Gerhard: Systematische Synthehse und Bewertung von mehrgangigen Plantengetriegen. Dissertation TU Chemnitz, 2007 das ges. Dokument insb. Kap. 1.2.

Gumpoltsberger, Gerhard: Systematic Synthesis and Evaluation of Multi-Stage Planetary Transmissions, Dissertation TU Chemnitz, 2007.

* cited by examiner

| GEAR | ENGAGED SHIFTING ELEMENTS | | | | | | i | phi |
|---|---|---|---|---|---|---|---|---|
| | 03 | 04 | 05 | 14 | 17 | 48 | | |
| 1. | × | | × | | | × | 5.000 | 1.667 |
| 2. | | × | × | | | × | 3.000 | 1.500 |
| 3. | | | × | × | | × | 2.000 | 1.429 |
| 4. | | | × | | × | × | 1.400 | 1.400 |
| 5. | | | | × | × | × | 1.000 | 1.222 |
| 6. | | × | | | × | × | 0.818 | 1.145 |
| 7. | × | | | | × | × | 0.714 | 1.191 |
| 8. | × | × | | | | × | 0.600 | 1.200 |
| 9. | × | | | × | | × | 0.500 | 10.000 |
| R. | × | | × | × | | | −4.000 | −0.800 |

MULTI-SPEED TRANSMISSION

This application claims priority from German patent application serial no. 10 2008 041 207.4 filed Aug. 13, 2008.

FIELD OF THE INVENTION

The present invention relates to a multi-step transmission in planetary design, especially an automatic transmission for a motor.

BACKGROUND OF THE INVENTION

According to the state of the art, automatic transmissions, especially for motor vehicles, comprise planetary gear sets, which are shifted by means of friction and/or shifting elements, such as clutches and brakes, and are typically connected to a starting element that is subject to a slip effect and optionally provided with a lock-up clutch, for example a hydrodynamic torque converter or a fluid clutch.

Such automatic transmissions are known from DE 199 49 507 A1 of the applicant, for example, wherein a multi-step transmission is disclosed in which two non-shiftable front-mounted gear sets are provided on the input shaft, which on the output side generate two speeds, which, apart from the speed of the input shaft, may optionally be shifted to a shiftable double planetary gear set acting on the output shaft by selectively engaging the used shifting elements such that, for changing from one gear to the next higher or lower gear, only one shifting element of the two just actuated shifting elements has to be engaged or disengaged. In this case, seven forward gears are achieved using five shifting elements, and nine or ten forward gears are achieved using six shifting elements.

Moreover, a multi-speed automatic transmission with eight forward gears and one reverse gear is known from DE 102 13 820 A1, comprising a first input path T1 of a first transmission ratio: an input path T2, which has a higher transmission ratio than this input path T1; a Ravigneaux-type planetary gear set with four elements, the four elements being a first element, a second element, a third element, and a fourth element in the sequence of the elements in a speed diagram; a clutch C-2, which transfers the rotation of the input path T2 to the first element S3; a clutch C-1, which transfers the rotation from the input path T2 to the fourth element S2; a clutch C4, which transfers the rotation from the input path T1 to the first element; a clutch C-3, which transfers the rotation from the input path T1 to the second element C3; a brake B-1, which engages the fourth element; a brake B-2, which engages the second element, and an output element, which is coupled to the third element S3.

A 9-speed multi-step transmission is further known from DE 29 36 969 A1; it comprises eight shifting elements and four gear sets, one gear set being used as a front-mounted auxiliary transmission, and the main transmission having a Simpson set and a further gear set used as a reversing drive.

Other multi-step transmissions are known, for example, from DE 102005010210 A1 and DE 102006006637 A1 of the applicant.

Automatically shiftable vehicle transmissions in planetary design have generally been described in the state of the art on many occasions, and are subject to continuous development and improvement. Accordingly, these transmissions are expected to require a low construction cost, in particular a small number of shifting elements, and to prevent double shifts during sequential gear changes, so that only one shifting element at a time is changed when shifting in defined gear groups.

From the unpublished DE 102008000428.3 of the applicant, a multi-step transmission in planetary design is known, which has an input element and an output element that are arranged in a housing. In the known transmission, at least four planetary gear sets are provided, hereinafter designated as first, second, third, and fourth planetary gear sets, at least eight rotatable shafts, hereinafter designated as input shaft, output shaft, third, fourth, sixth, seventh, and eighth shaft, as well as at least six shifting elements, comprising brakes and clutches, whose selective engagement generates different transmission ratios between the input element and output element, so that preferably nine forward gears and one reverse gear can be implemented.

In this case, the first and second planetary gear set, which are preferably configured as minus planetary gear sets, form a shiftable front-mounted gear set, the third and fourth planetary gear sets forming a main gear set.

With respect to the known multi-step transmission, it is provided that the carriers of the first and second planetary gear sets are coupled to one another via the fourth shaft, which is connected to an element of the main gear set, that the ring gear of the first planetary gear set is coupled to the sun gear of the second planetary gear set via the eighth shaft, which can be detachably connected via a first clutch to the input shaft, and that the sun gear of the first planetary gear set can be coupled by means of the third shaft to a transmission housing via a first brake, and can be detachably connected to the input shaft via a second clutch, while the ring gear of the second planetary gear set can be coupled by means of the fifth shaft to a transmission housing via a second brake. In addition, the seventh shaft is permanently connected to at least one element of the main gear set and can be coupled to a transmission housing via a third brake, while the sixth shaft is permanently connected to at least one further element of the main gear set and can be detachably connected to the input shaft via a third clutch; the output shaft is permanently connected to at least one further element of the main gear set.

In the known transmission, the fourth shaft is preferably permanently connected to the ring gear of the third planetary gear set, while the sixth shaft can be permanently connected to the ring gear of the fourth planetary gear set and to the carrier of the third planetary gear set, and can be detachably connected via the third clutch to the input shaft. Further, the seventh shaft is permanently connected to the sun gears of the third and fourth planetary gear set, and can be coupled via the third brake to a transmission housing. In this connection, output is via the output shaft that is permanently connected to the carrier of the fourth planetary gear set. Furthermore, the third and fourth planetary gear sets can be combined and/or reduced to a Ravigneaux set with a common carrier and a common ring gear.

SUMMARY OF THE INVENTION

The object of the present invention is to propose a multi-step transmission of the type mentioned above, having at least nine forward gears and at least one reverse gear with an adequate transmission ratio, in which the construction costs and the installation size, in particular the installation length and/or weight, are optimized, and in addition, the efficiency with regard to drag and gearing losses is improved. In addition, in the multi-step transmission according to the invention, a small number of support moments ought to act up the shifting elements. In particular, the transmission according to the invention should be suitable for a transverse design.

Thus, a multi-step transmission in planetary design according to the invention is proposed, which has an input element and an output element that are arranged in a housing. Moreover, at least four planetary gear sets, hereinafter designated as first, second, third and fourth planetary gear sets, at least eight rotatable shafts, hereinafter designated as input shaft, output shaft, third, fourth, sixth, seventh and eighth shafts, as well as at least six shifting elements, comprising brakes and clutches are provided, whose selective engagement generates different transmission ratios between the input element and output element, so that preferably nine forward gears and one reverse gear can be implemented. Preferably, the second and third planetary gear sets can be combined and/or reduced to a Ravigneaux set and have a common carrier and a common ring gear.

According to the invention, the sun gear of the first planetary gear set can be detachably connected by means of the eighth shaft and via a first clutch to the fourth shaft, which can be detachably connected via a second clutch to the input shaft, can be coupled via a first brake to the transmission housing, and is connected to the sun gear of the fourth planetary gear set, the ring gear of the first planetary gear set being connected to the input shaft, which can be detachably connected via a third clutch to the seventh shaft, which is connected to the carriers of the third and second planetary gear set.

Furthermore, the carrier of the first planetary gear set is connected via the sixth shaft to a component, which connects the ring gear of the fourth planetary gear set to the sun gear of the third planetary gear set, while the carrier of the fourth planetary gear set can be coupled to a transmission housing via the third shaft and a second brake, while the sun gear of the second planetary gear set can be coupled to a transmission housing via the fifth shaft and a third brake, and the input shaft is connected to the ring gears of the third and second planetary gear sets.

In the case when the second and third planetary gear sets are combined and/or reduced to a Ravigneaux set with a common carrier and a common sun gear, the carrier of the Ravigneaux set is connected to the seventh shaft, which can be detachably connected via a clutch to the input shaft, the output shaft being connected to the ring gear of the Ravigneaux set.

By means of the embodiment of the multi-step transmission according to the invention, suitable transmission ratios are obtained, especially for passenger cars, as well as a considerable increase in the overall gear spread of the multi-step transmission, thus improving driving comfort and significantly reducing consumption.

Furthermore, with the multi-step transmission according to the invention, the construction costs are considerably reduced owing to the small number of shifting elements. Start-up with a hydrodynamic converter, an external starting clutch, or with other suitable external starting elements, is advantageously possible with the multi-step transmission according to the invention. It is also conceivable to allow a start-up process with a starting element incorporated in the transmission. Preferably, a shifting element that is actuated in the first forward gear and in the reverse gear is suitable.

Furthermore, with the multi-step transmission according to the invention, good efficiency is achieved in the main gears with respect to drag and gearing losses.

In addition, there is less torque in the shifting elements and in the planetary gear sets of the multi-step transmission, advantageously reducing wear and tear in the multi-step transmission. Further, owing to the low torque, correspondingly smaller dimensions are possible, so that the required installation space and corresponding costs are reduced. Moreover, the speeds of the shafts, shifting elements, and planetary gear sets are also reduced.

In addition, the multi-step transmission according to the invention is designed such that it can be adapted to different power train embodiments both in the direction of the power flow and spatially.

BRIEF DESCRIPTION OF THE DRAWINGS

The present invention is explained in more detail below in examples, with reference to the attached figures, which show.

DETAILED DESCRIPTION OF THE PREFERRED EMBODIMENTS

Figure 1:
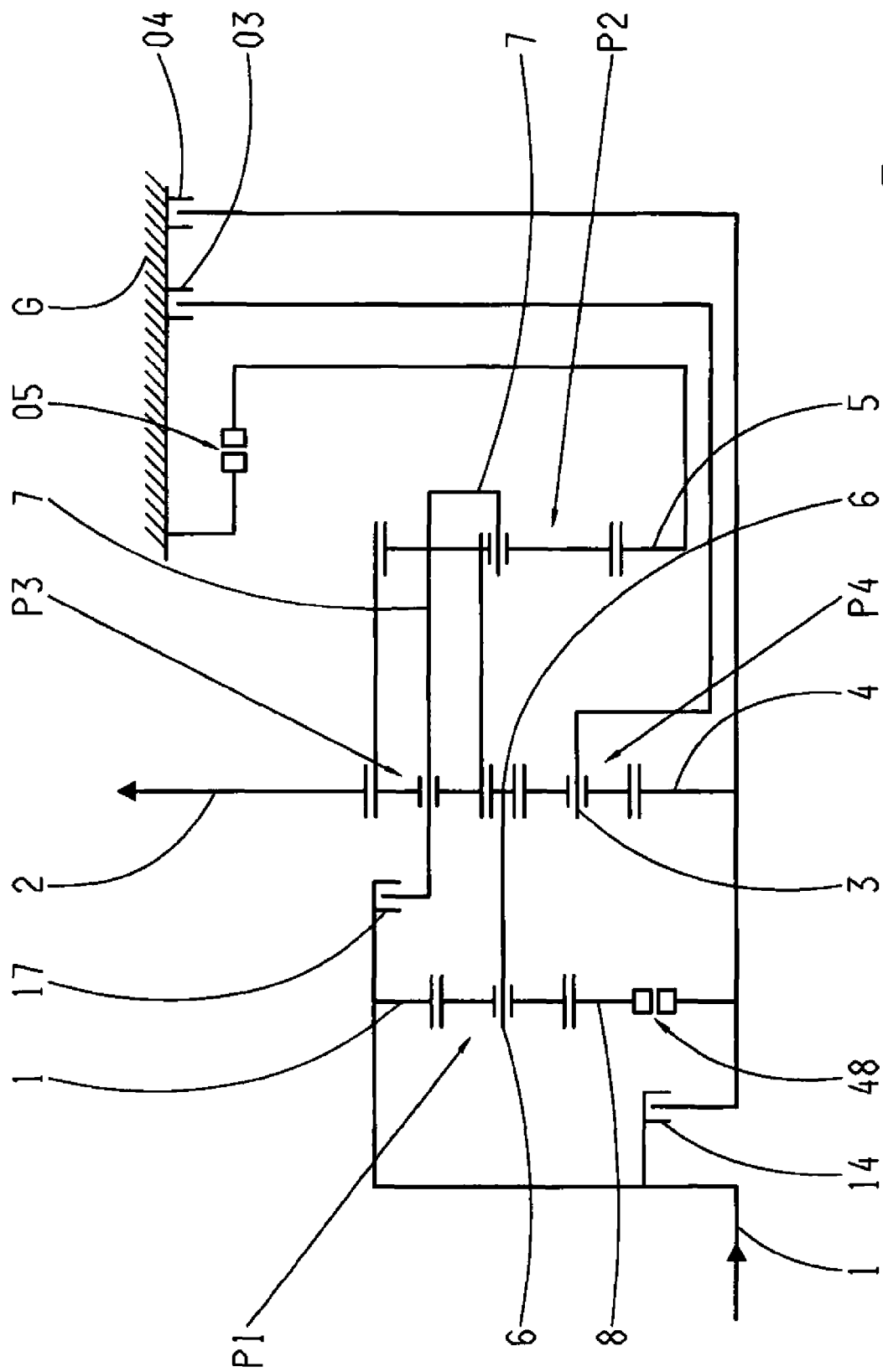
FIG. 1 a schematic view of a preferred embodiment of a multi-step transmission according to the invention.

FIG. 1 shows a multi-step transmission according to the invention with an input shaft 1, an output shaft 2, and four planetary gear sets P1, P2, P3, and P4 that are arranged in a housing G. The first, third, and fourth planetary gear sets P1, P3, P4 are configured as minus planetary gear sets, and the second planetary gear set P2 is configured as a plus planetary gear set.

As is generally known, a simple minus planetary gear set comprises a sun gear, a ring gear and a carrier, on which planetary gears are rotatably mounted, which respectively mesh with the sun gear and ring gear. As a result of this, the ring gear rotates in the opposite direction of the sun gear when the carrier is detained. In contrast, a simple plus planetary gear set comprises a sun gear, a ring gear, and a carrier, on which inner and outer planetary gears are rotatably mounted, all inner planetary gears meshing with the sun gear and all outer planetary gears meshing with the ring gear, each inner planetary gear respectively meshing with an outer planetary gear. As a result of this the ring gear rotates in the same direction as the sun gear when the carrier is detained.

In the example shown in FIG. 1, the second and third planetary gear set P2, P3 are combined and/or reduced to a Ravigneaux set with a common carrier and a common ring gear.

According to further embodiments, the planetary gear sets P2 and P3 can be configured as separate planetary gear sets. In the shown exemplary embodiment, which is particularly suitable for a transverse design, the fourth planetary gear set P4 and the third planetary gear set P3 are arranged in the same gear set plane when viewed axially, whereby the third planetary gear set P3 is arranged over the fourth planetary gear set P4 when viewed radially, so that the total of four planetary gear sets are advantageously limited spatially to three gear set planes when viewed axially. Here the ring gear of the fourth planetary gear set P4 is connected to the third planetary gear set P3. Viewed axially, the planetary gear sets in this case are arranged in the sequence P1, P3/P4, P2.

As can be seen in FIG. 1, six shifting elements, namely three brakes 03, 04, 05, and three clutches 14, 17, and 48 are provided. The spatial arrangement of the shifting elements can be arbitrary and is limited only by the dimensions and external shape.

With these shifting elements, selective shifting of nine forward gears and one reverse gear can be implemented. The multi-step transmission according to the present invention has a total of eight rotatable shafts, namely the shafts 1, 2, 3, 4, 5, 6, 7, and 8, the first shaft forming the input shaft and the second shaft forming the output shaft of the transmission.

According to the invention, with respect to the multi-step transmission of FIG. 1, it is provided that the sun gear of the first planetary gear set P1 can be detachably connected by means of the eighth shaft 8 and via a first clutch 48 to the fourth shaft 4, which can be detachably connected via a second clutch 14 to the input shaft 1, can be coupled to the transmission housing G via a first brake 04, and is connected to the sun gear of the fourth planetary gear set P4. Further, the ring gear of the first planetary gear set P1 is connected to the input shaft 1, which can be detachably connected via a third clutch 17 to the shaft 7, which is connected to the carrier of the Ravigneaux set and/or, in the case when the second and third planetary gear set P2, P3 are configured as separate planetary gear sets, to the carriers of the third and second planetary gear sets P3, P2.

In addition, the carrier of the first planetary gear set P1 is connected via the sixth shaft 6 to the component that connects the ring gear of the fourth planetary gear set P4 to the sun gear of the third planetary gear set P3.

According to the invention, the carrier of the fourth planetary gear set P4 can be coupled via the third shaft 3 and a second brake 03 to the transmission housing G, while the sun gear of the second planetary gear set P2 can be coupled via the fifth shaft 5 and a third brake 05 to the transmission housing G.

The output shaft 2 is connected to the ring gear of the Ravigneaux set and/or, for the case when the second and third planetary gear sets P2, P3 are configured as separate planetary gear sets, to the ring gears of the third and second planetary gear sets P3, P2.

Preferably, the first clutch 48 is arranged below the first planetary gear set P1 when viewed from the radial direction; the third clutch 17 is arranged between the first planetary gear set P1 and the planetary gear sets P3, P4 arranged radially over one another when viewed from the axial direction. Further, the brakes 05, 03, and 04 are preferably arranged side by side when viewed from the axial direction.

Figures 2, 3:
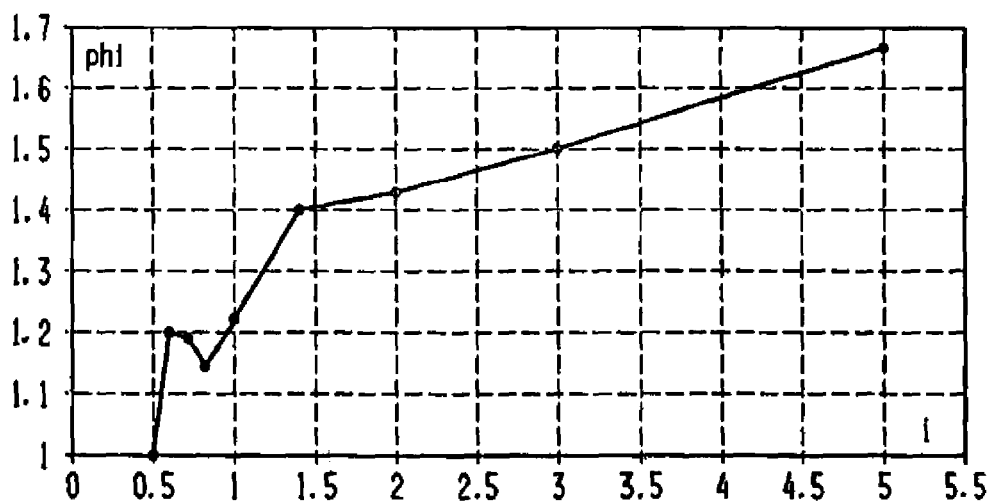
FIG. 2 an exemplary gear shift pattern for a multi-step transmission according to FIG. 1.
FIG. 3 a diagram to illustrate the progressive ratio phi corresponding to the respective transmission ratio i of a gear for the transmission shown in FIG. 1.

FIG. 2 shows an exemplary gear shift pattern of a multi-step transmission according to FIG. 1. Three shifting elements are engaged for each gear. The particular transmission ratios i of the individual gear steps, and the transition ratios and/or progressive ratios phi to the next higher gear, for example, to be determined from them, can be found from the gear shift pattern, where by the value 10.000 constitutes the transmission spread.

Typical values for standard transmission ratios of the planetary gear sets P1, P2, P3, and P4 are, respectively, −2.0, 3.50, −1.50 and −2.0. FIG. 2 shows that double shifting and/or range shifting are avoided in sequential shifting mode because two adjacent gear steps use two shifting elements in common, allowing a total of nine forward gears and one reverse gear to be shifted. It is further apparent that an ample spread is achieved with small gear transitions.

The first clutch 48 and/or the third brake 05 are preferably configured as claw shifting elements. In that way, the drag torque of the transmission resulting from the small distance between the friction surfaces of a friction shifting element in the open state and of the oil and/or air-oil mixture contained therein is reduced. The remaining clutches 14, 17 and the remaining brakes 03, 04 are preferably configured as friction shifting elements and/or disk shifting elements.

The first forward gear results from engaging the first clutch 48 and the second and third brakes 03, 05, the second forward gear from engaging the first and third brakes 04, 05 and the first clutch 48, the third forward gear from engaging the second brake 03 and the second and first clutch 14, 48, the fourth forward gear from engaging the third brake 05 and the third and first clutch 17, 48, the fifth forward gear from engaging the second, third, and first clutch 14, 17, 48, the sixth forward gear from engaging the first brake 04 and the third and first clutch 17, 48, the seventh forward gear from engaging the second brake 03 and the third and first clutch 17, 48, the eighth forward gear from engaging the second and first brake 03, 04 and the third clutch 17, and the ninth forward gear from engaging the second brake 03 and the second and third clutch 14, 17. The reverse gear results from engaging the second and third brake 03, 05 and the second clutch 14.

As a result of engaging the second and third brake 03, 05 in the first forward gear and in the reverse gear, the shifting elements (configured as friction shifting elements and/or disk shifting elements) can be used as starting elements.

According to the invention, depending on the gear shift logic, different gear transitions can be implemented even with the same shift pattern, making application and/or vehicle-specific variations possible.

A diagram to illustrate the progressive ratio phi corresponding to the respective transmission ratio i of a gear for the transmission shown in FIG. 1 according to the values shown in FIG. 2 is the subject matter of FIG. 3.

Figure 4:
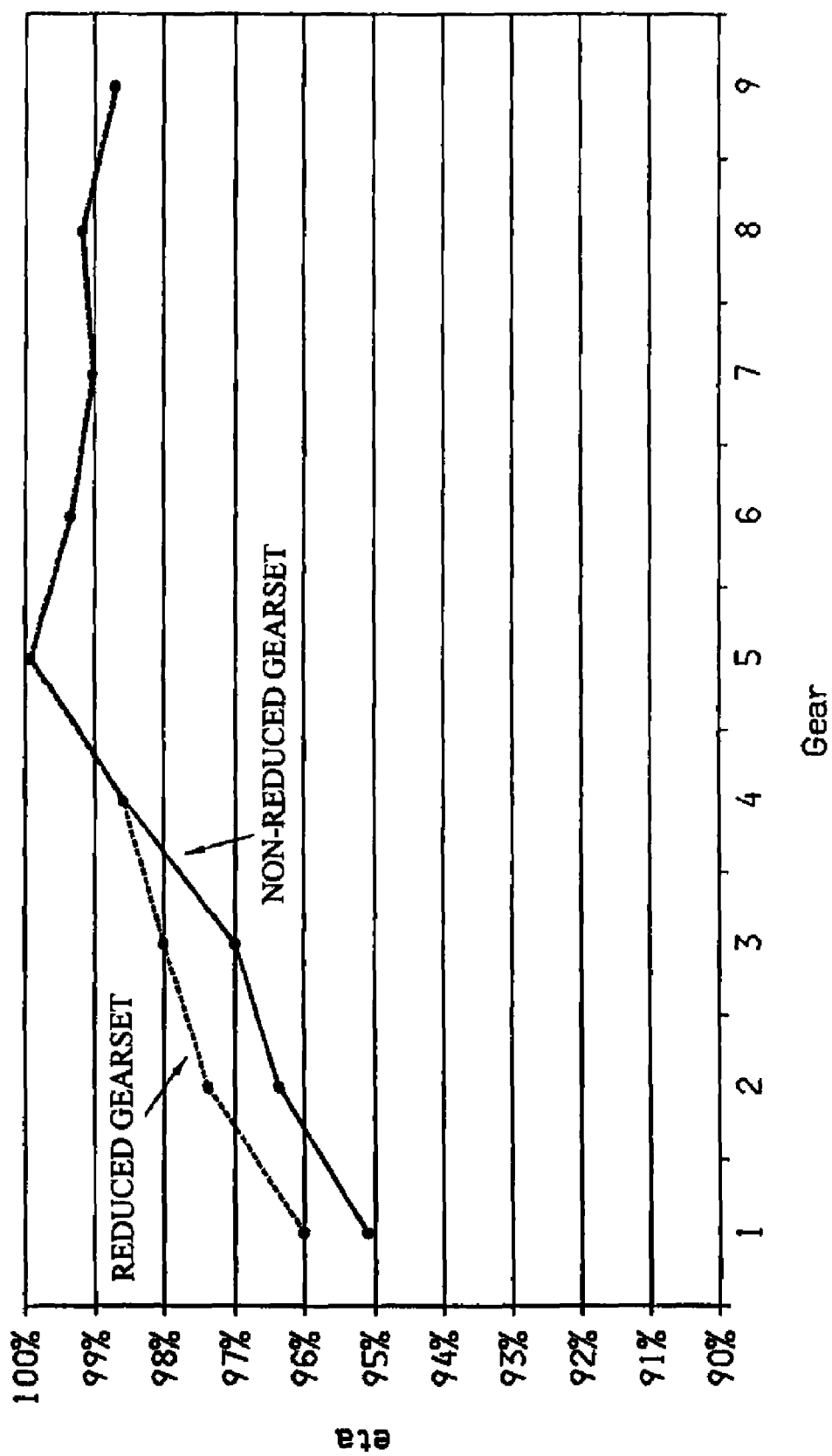
FIG. 4 a diagram to illustrate the level of efficiency of the respective gear for the transmission shown in FIG. 1.

With reference to the diagram shown in FIG. 4, which shows the efficiency eta as a function of the respective gear of a transmission according to the invention, it is clear that the configuration of the second and third planetary gear sets as a Ravigneaux set results in an improvement in the efficiency of the first, second, and third forward gear.

According to the invention, it possible to provide additional free-wheel clutches at each suitable point of the multi-step transmission, for example between a shaft and the housing or in order to connect two shafts.

According to the invention, a differential and/or transfer differential can be arranged on the input side or the output side.

In line with an advantageous improvement, the input drive shaft 1 can be separated from a drive motor by a coupling element as required, while a hydrodynamic converter, hydraulic clutch, dry start clutch, wet start clutch, magnetic powder clutch, or centrifugal clutch can be used as a clutch element. It is also possible to arrange such a starting element in the direction of the power flow behind the transmission, in this case the input shaft 1 being permanently connected to the engine crankshaft.

The multi-step transmission according to the invention also allows the placement of a torsion vibration damper between the engine and the transmission.

In line with another embodiment of the invention (not illustrated) a wear-free brake, e.g. a hydraulic or electric retarder or a similar device, can be arranged on the input shaft 1 or output shaft 2, which is especially important for use in commercial vehicles. Furthermore, a power takeoff may be provided on each shaft, preferably on the input shaft 1 or output shaft 2, for driving additional aggregates.

The friction shifting elements employed in the design can be powershift clutches or brakes. In particular, non-positive clutches or brakes, such as multi-disk clutches, band brakes, and/or cone clutches can be used.

A further advantage of the present multi-step transmission is that an electrical machine may additionally be installed on each shaft as a generator and/or additional drive machine.

Of course, any structural embodiment, particularly any spatial arrangement of the planetary gear sets and shifting elements in themselves and in relation to one another, to the extent technically expedient, falls under the scope of protection of the present claims, without influencing the function of the transmission as described in the claims, even if these embodiments are not explicitly illustrated in the figures or mentioned in the description.

REFERENCE NUMERALS 1 first shaft, input shaft
2 second shaft, output shaft
3 third shaft
4 fourth shaft
5 fifth shaft
6 sixth shaft
7 seventh shaft
8 eighth shaft
03 second brake
04 first brake
05 third brake
14 second clutch
17 third clutch
48 first clutch
P1 first planetary gear set
P2 second planetary gear set
P3 third planetary gear set
P4 fourth planetary gear set
i transmission ratio
phi progressive ratio
G housing
eta efficiency

The invention claimed is:

1. A multi-step transmission in planetary design for a motor vehicle, the transmission comprising:
a drive input shaft (1) and an output shaft (2);
first, second, third and fourth planetary gear sets (P1, P2, P3, P4) being arranged in a housing (G) of the transmission, each of the first planetary gear set (P1), the second planetary gear set (P2), the third planetary gear set (P3) and the fourth planetary gear set (P4) having a sun gear, a carrier and a ring gear;
at least third, fourth, fifth, sixth, seventh and eighth rotatable shafts (3, 4, 5, 6, 7, 8);
six shifting elements (03, 04, 05, 14, 17, 48) comprising first, second and third brakes (04, 03, 05) and first, second, and third clutches (48, 14, 17) and selective engagement of the six shifting elements (03, 04, 05, 14, 17, 48) achieves different gear ratios, between the input shaft (1) and the output shaft (2), such that nine forward gears and one reverse gear can be implemented;
the sun gear of the first planetary gear set (P1) is coupled to the eighth shaft (8) and the eighth shaft (8) is connectable, via the first clutch (48), to the fourth shaft (4),
the fourth shaft (4) is coupled to the sun gear of the fourth planetary gear set (P4) and is connectable, via the second clutch (14), to the input shaft (1), and, via the first brake (04), to the housing (G) of the transmission;
the ring gear of the first planetary gear set (P1) is coupled to the input shaft (1), and the input shaft (1) is connectable, via the third clutch (17), to the seventh shaft (7), which is coupled to the carrier of the third planetary gear set (P3) and the carrier of the second planetary gear set (P2);
the carrier of the first planetary gear set (P1) is coupled to the sixth shaft (6), and the sixth shaft (6) is coupled to a component that couples the ring gear of the fourth planetary gear set (P4) and the sun gear of the third planetary gear set (P3);
the carrier of the fourth planetary gear set (P4) is coupled to the third shaft (3), and third shaft (3) is connectable, via the second brake (03) to the housing (G) of the transmission;
the sun gear of the second planetary gear set (P2) is coupled to the fifth shaft (5), and the fifth shaft (5) is connectable, via the third brake (05), to the housing (G) of the transmission; and
the output shaft (2) is coupled to the ring gear of the third planetary gear set (P3) and the ring gear of the second planetary gear set (P2).

2. The multi-step transmission according claim 1, wherein the second planetary gear set (P2) and the third planetary gear set (P3) form a Ravigneaux set with a common carrier and a common ring gear, the carrier of the Ravigneaux set is coupled to the seventh shaft (7), and the output shaft (2) is coupled to the ring gear of the Ravigneaux set.

3. The multi-step transmission according claim 1, wherein the first planetary gear set (P1), the third planetary gear set (P3), and the fourth planetary gear set (P4) are minus planetary gear sets, and the second planetary gear set (P2) is a plus planetary gear set.

4. The multi-step transmission according claim 1, wherein the fourth planetary gear set (P4) and the third planetary gear set (P3) are axially arranged on a common gear set plane, and the third planetary gear set (P3) is arranged radially about the fourth planetary gear set (P4) such the first planetary gear set (P1), the second planetary gear set (P2), the third planetary gear set (P3) and the fourth planetary gear set (P4) are axially spatially restricted to three gear set planes.

5. The multi-step transmission according claim 1, wherein the first clutch (48) is radially arranged radially inward of the first planetary gear set (P1).

6. The multi-step transmission according claim 1, wherein the third clutch (17) is axially arranged between the first planetary gear set (P1) and the third planetary gear set (P3) and the fourth planetary gear set (P4), and the third planetary gear set (P3) is arranged radially about the fourth planetary gear set (P4).

7. The multi-step transmission according claim 1, wherein the third brake (05), the second brake (03) and the first brake (04) are axially arranged adjacent one anther.

8. The multi-step transmission according claim 1, wherein at least one of the first clutch (48) and the third brake (05) is a claw-type shifting element and a remainder of the six shifting elements (03, 04, 05, 14, 17, 48) are frictional shifting elements.

9. The multi-step transmission according claim 1, wherein
a first forward gear is implemented by engagement of the first clutch (48), the second brake (03) and third brake (05);
a second forward gear is implemented by engagement of the first brake (04), the third brake (05) and the first clutch (48);
a third forward gear is implemented by engagement of the third brake (05), the second clutch (14) and the first clutch (48);
a fourth forward gear is implemented by engagement of the third brake (05), the third clutch (17) and the first clutch (48);
a fifth forward gear is implemented by engagement of the second clutch (14), the third clutch (17) and the first clutch (48);
a sixth forward gear is implemented by engagement of the first brake (04), the third clutch (17) and the first clutch (48);

a seventh forward gear is implemented by engagement of the second brake (03), the third clutch (17) and the first clutch (48);

an eighth forward gear is implemented by engagement of the second brake (03) and the first brake (04) and the third clutch (17);

a ninth forward gear is implemented by engagement of the second brake (03), the second clutch (14) and the third clutch (17); and the reverse gear is implemented by engagement of the second brake (03), the third brake (05) and the second clutch (14).

10. The multi-step transmission according claim 1, wherein either the second brake (03) or the third brake (05) provides a starting operation for the transmission.

* * * * *